(12) United States Patent
Szidzek et al.

(10) Patent No.: US 7,661,708 B2
(45) Date of Patent: Feb. 16, 2010

(54) GAS BAG MODULE

(75) Inventors: Claudia Szidzek, Obernburg (DE);
Michael Schneider, Sulzbach (DE);
Marcus Magoley, Aschaffenburg (DE);
Ralph Frisch, Möembris (DE)

(73) Assignee: TRW Automotive Safety Systems GmbH, Aschafenburg (DE)

( * ) Notice: Subject to any disclaimer, the term of this patent is extended or adjusted under 35 U.S.C. 154(b) by 376 days.

(21) Appl. No.: 11/334,019

(22) Filed: Jan. 18, 2006

(65) Prior Publication Data

US 2006/0163855 A1    Jul. 27, 2006

(30) Foreign Application Priority Data

Jan. 21, 2005 (DE) .................... 20 2005 000 999 U
May 25, 2005 (DE) ........................ 10 2005 024 113
Dec. 22, 2005 (EP) .................................. 05028171

(51) Int. Cl.
*B60R 21/16* (2006.01)
(52) U.S. Cl. .................................................. 280/743.1
(58) Field of Classification Search .............. 280/743.1, 280/739, 736
See application file for complete search history.

(56) References Cited

U.S. PATENT DOCUMENTS

| | | | |
|---|---|---|---|
| 5,865,466 A | 2/1999 | Yamamoto et al. | |
| 5,871,231 A | 2/1999 | Richards et al. | |
| 5,899,495 A | 5/1999 | Yamamoto et al. | |
| 6,334,627 B1 | 1/2002 | Heym et al. | |
| 6,349,964 B1 | 2/2002 | Acker et al. | |
| 6,390,501 B1 | 5/2002 | Greib et al. | |
| 6,406,055 B1 | 6/2002 | Faigle et al. | |
| 6,513,835 B2 | 2/2003 | Thomas | |
| 7,017,945 B2* | 3/2006 | DePottey et al. | 280/739 |
| 7,240,917 B2* | 7/2007 | Fogle et al. | 280/739 |
| 2003/0197359 A1 | 10/2003 | Heath | |

FOREIGN PATENT DOCUMENTS

| | | |
|---|---|---|
| DE | 28222159 | 6/1999 |
| DE | 19756977 | 7/1999 |
| DE | 10205699 | 10/2002 |
| DE | 10210328 | 10/2002 |
| DE | 19813832 | 10/2003 |
| EP | 1407942 | 4/2004 |

\* cited by examiner

*Primary Examiner*—Faye M. Fleming
(74) *Attorney, Agent, or Firm*—Tarolli, Sundheim, Covell & Tummino LLP

(57) ABSTRACT

A gas bag module has a gas bag whose wall, in a first state of the gas bag, has at least one pleat that is formed in that opposite sections of the wall lie against each other. The gas bag module further has a holder that holds the opposite sections together and affixes the pleat. The holder can be actively released in response to a signal, as a result of which the gas bag reaches a second state in which the pleat is opened.

27 Claims, 8 Drawing Sheets

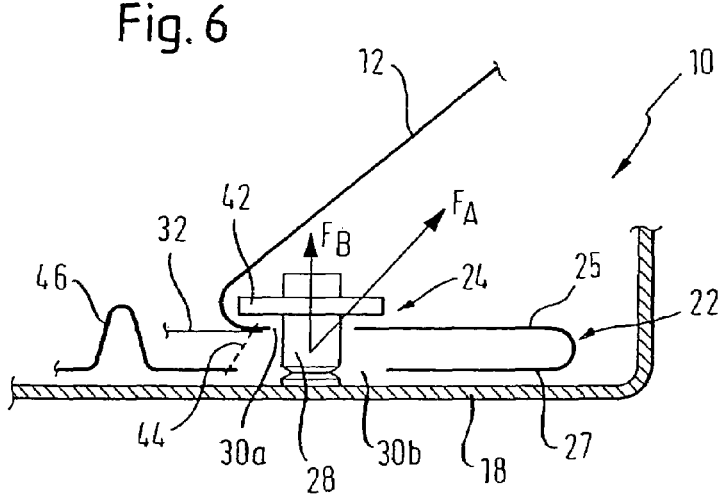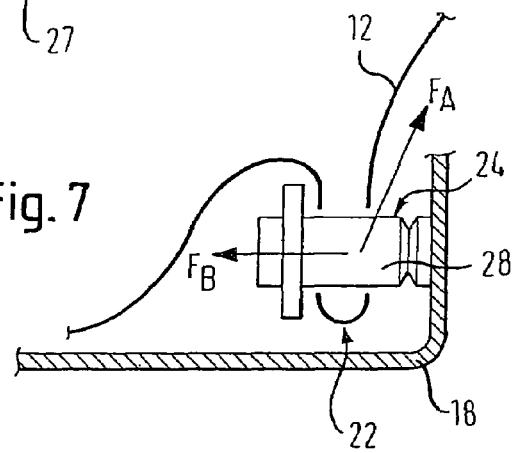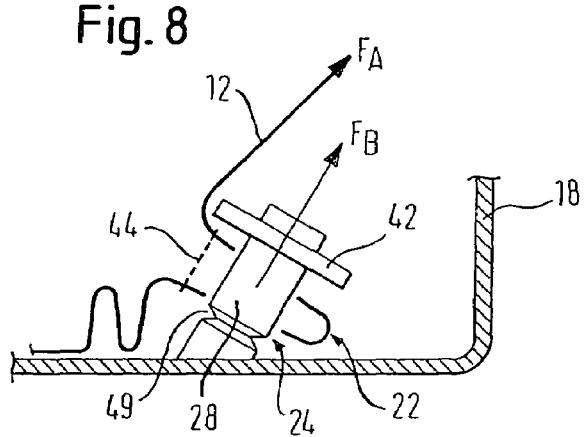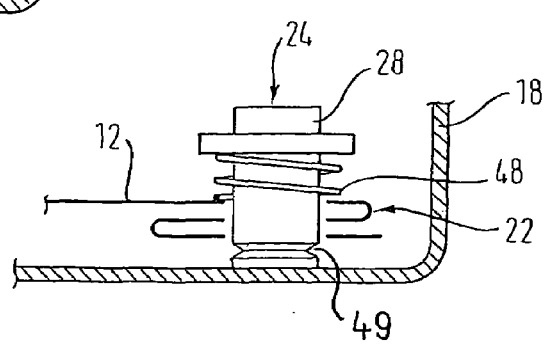

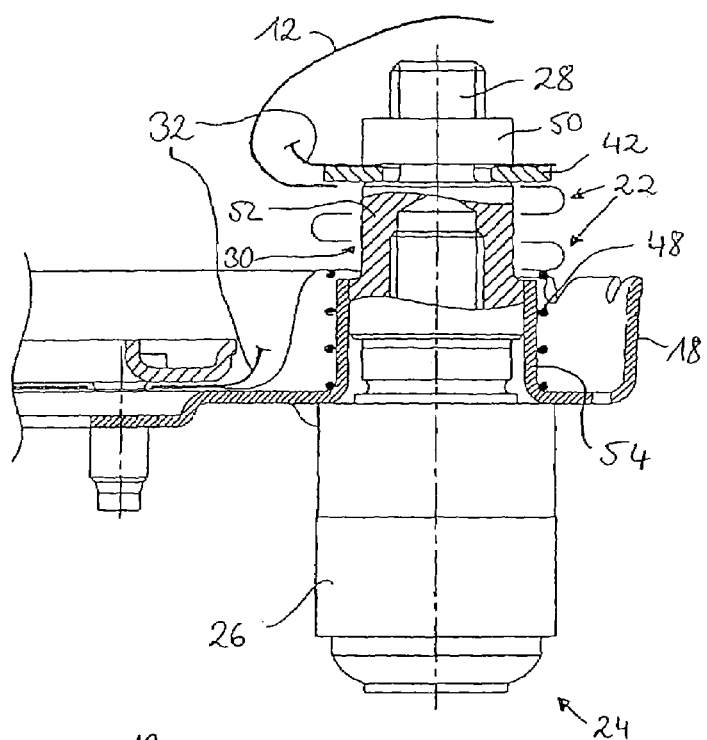
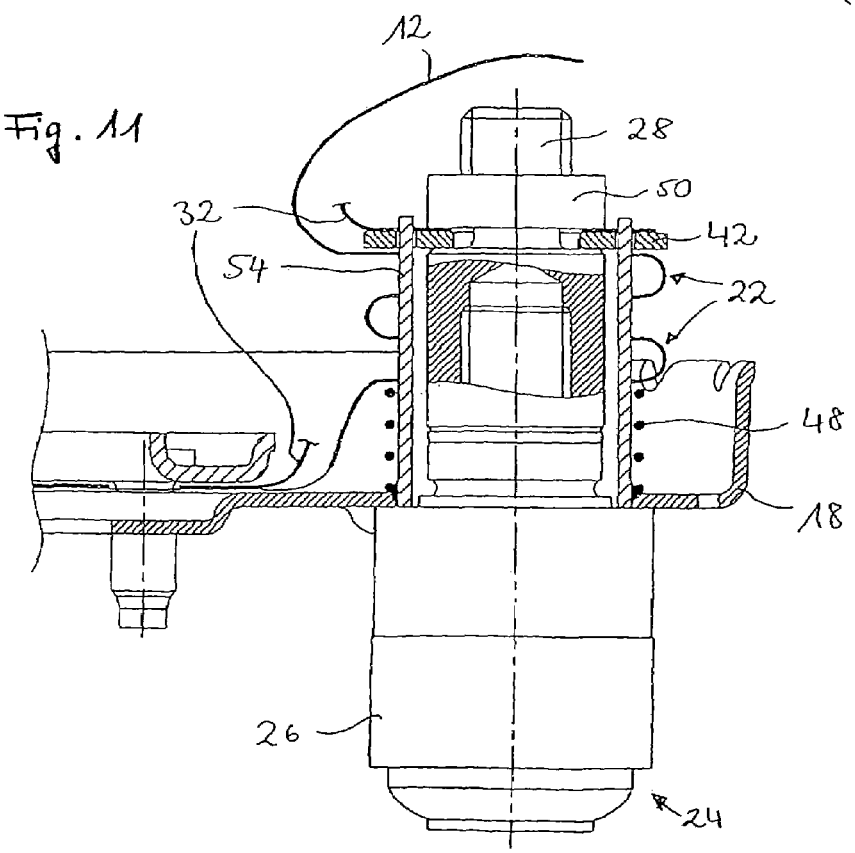

GAS BAG MODULE

TECHNICAL FIELD

The present invention relates to a gas bag module.

BACKGROUND OF THE INVENTION

Normally speaking, in a gas bag module of a vehicle occupant restraint system, the gas bag is supposed to be inflated as quickly as possible with the gas generated by a gas generator. In certain cases, for example, in response to a collision at a relatively low speed or depending on the height, weight or position of the vehicle occupant to be protected, it is desirable to have a softer gas bag. For this purpose, for example, discharge openings can be provided in the module housing through which some of the available gas volume can escape. This solution, however, has the drawback that installation space has to be provided in the module housing for the discharge opening itself as well as possibly for an opening mechanism.

Another approach that has been known for a long time for achieving a reduced internal gas bag pressure is to provide a pleat in the wall of the non-inflated gas bag in that opposite wall sections lie against each other, the pleat being affixed by a rupture seam. If the internal gas bag pressure exceeds a predetermined value after the activation of the gas bag module, the rupture seam tears open, as a result of which the volume of the gas bag is increased and the internal gas bag pressure is reduced. It is also a known procedure to provide a discharge opening in the area of the pleat that is at first closed by the pleat and then exposed after the rupture seam tears, thus achieving a further reduction of the internal gas bag pressure.

A drawback of this known embodiment is that it does not allow the internal gas bag pressure to be adapted as a function of the situation. The rupture seam will definitely tear exactly when the internal gas bag pressure predetermined by the properties of the rupture seam has been reached.

In contrast, the invention provides a gas bag module that allows a rapid reduction of the internal gas bag pressure as a function of the momentary accident or vehicle (occupant) situation and that is nevertheless distinguished by the fact that it requires little space and is easy to manufacture.

BRIEF SUMMARY OF THE INVENTION

This is achieved in a gas bag module having a gas bag whose wall, in a first state of the gas bag, has at least one pleat that is formed in that opposite sections of the wall lie against each other, and having a holder that holds the opposite sections together and affixes the pleat. The holder is actively releasable in response to a signal, as a result of which the gas bag reaches a second state in which the pleat is opened. Thus, due to the fact that the active holder can be systematically released in an externally controlled manner, it is ensured that, regardless of the internal gas bag pressure, the internal gas bag pressure is reduced by changing the gas bag from the first into the second state only when this is really desired. Thus, in case of a collision at high speed or an especially heavy vehicle occupant, a requisite high internal gas bag pressure and thus a harder gas bag can be maintained, whereas in case of a collision at a lower speed or a lighter vehicle occupant, a softer gas bag can be provided. Moreover, the desired reduction of the internal gas bag pressure is uncoupled from the profile of the internal gas bag pressure, also in terms of the timing, thus yielding a system that can be adapted variably to all kinds of situations.

According to a preferred embodiment, the holder comprises a drive that is advantageously a pyrotechnical drive. The term "drive" does not define that a part has to be displaced, rather, energy is set free in said drive and frees the holder. This makes it possible to unfold the pleat especially quickly and to rapidly reduce the internal gas bag pressure whenever this is necessary.

Preferably, the holder has a separation bolt that is a simply structured, inexpensive mass-produced article.

The holder can have a clamp strap that affixes the pleat in the gas bag wall and that is released as needed.

Advantageously, at least one catching element is provided by means of which a part of the holder that is separated when activated is connected to the module. This prevents loose parts from being hurled around.

Preferably, the holder directly engages one of the sections of the wall that form the pleat. This can be especially the wall section that is on the inside with respect to the first state of the gas bag.

Advantageously, the holder is attached to a rigid bearing part, as a result of which an especially secure attachment is ensured.

The bearing part is preferably a gas generator support of the gas bag module. This offers the advantage that the gas bag module can be configured as a pre-assembled unit that can be installed in its entirety simply and thus inexpensively into the vehicle.

According to a preferred embodiment, the unfolded gas bag has a larger volume in the second state than in the first state. Depending on the volume difference between the first state and the second state, a sufficient reduction of the internal gas bag pressure can already be achieved in this manner.

According to another embodiment, in the vicinity of the pleat, the gas bag wall has at least one discharge opening that is advantageously closed by the pleat in the first state of the gas bag and that can be opened in the second state of the gas bag. The result is an even more comprehensive and continuous pressure reduction.

In the first state of the gas bag, the gas bag wall can also have several pleats. In this manner, an especially large volume difference and thus a rapid pressure reduction is achieved between the first state and second state of the gas bag.

A rupture seam can be provided for purposes of additional fixation of the pleat. When the gas bag unfolds, this rupture seam absorbs some of the tensile force that the gas bag exerts onto the holder.

Advantageously, the holder comprises a spring. In the first state of the gas bag, this spring presses on the pleat(s) and thus, depending on the concrete embodiment, makes it easier to release the holder from the gas bag or to pull the pleat(s) away from the holder.

The spring preferably runs along a sleeve that serves to stabilize the spring in position. In case of a holder having a pyrotechnical drive, another advantage is achieved in that the sleeve is arranged around the drive, thus encapsulating it, so to speak. As a result, when the pyrotechnical charge is triggered, any possible damage to the gas bag fabric is avoided.

According to a preferred embodiment of the invention, the holder has a fastening strap that holds the pleat in the first state of the gas bag. This fastening strap is released as needed in order to change the gas bag from the first state into the second state.

In the first state of the gas bag, the fastening strap can pass through an opening in the pleat. At the same time, in the second state of the gas bag, this opening serves as a discharge opening.

One end of the fastening strap can be connected to the gas bag wall in order to achieve a fixation of the pleat. As an alternative, it is also conceivable to attach one end of the fastening strap to a rigid bearing part. This bearing part is, for example, the generator support or a gas bag holding plate. In both cases, the other end of the fastening strap is detachably connected to the bearing part, for example, via a separation bolt. Here, the limited length of the fastening strap at first prevents a release of the pleat(s). If the separation bolt is activated, then one end of the fastening strap is released, as a result of which the gas bag can unfurl further, the pleats are opened up, and the fastening strap is pulled through the pleats.

According to another embodiment of the invention, it is provided that the holder comprises a drive that is integrated into a multi-stage gas generator. As a result, it is possible to dispense with a separate drive for opening up the pleat.

In particular, it is provided that, when a certain stage of the gas generator is ignited, the fastening strap is destroyed, at least partially. If it is required, for example the second stage of the multi-stage gas generator is ignited after the deployment of the gas bag and in response to a signal. Part of the hot gas thus formed is conveyed onto the fastening strap. The strap is thus at least partially melted or burned, in order to release the pleat(s) in the gas bag.

According to an especially preferred embodiment, the fastening strap has two ends connected to the gas bag wall, the junctions being spatially separated from each other. Upon activation of the gas bag module, when the fastening strap is tautened, the force is thus introduced into the gas bag wall at two different places, as a result of which a lower stress on the fabric forming the wall is achieved. Further, a certain elasticity of the arrangement is achieved since due to the tension exerted on the fastening strap when the gas bag unfolds, the two junctions move towards and away from each other and are therefore resilient, so to speak.

In particular, the fastening strap extends in a V-shape when the gas bag is in an inflated state. Good force ratios arise when the two legs of the V together include an angle of approximately 90°.

The holder can have a cord that is releasably attached to a rigid bearing part. When the gas bag is to be changed from the first into the second state, the cord is detached from the rigid bearing part and thus releases the pleat(s). A cord offers the advantage that it can also be pulled through a small opening in the pleat of the gas bag wall in order to release the pleat, and that a smaller packing volume is present.

The cord preferably forms a loop through which the fastening strap passes. In this configuration, at least one end of the fastening strap is connected to the gas bag wall, whereas a second end is fixed to the cord which in turn passes through the pleat(s) and is releasably attached to a rigid bearing part, for example. Such a cord is especially advantageously combined with a fastening strap that runs in a V-shape and has two ends connected to the gas bag wall. The lower tip of the V passes through the loop in the cord which in turn is "threaded" through the pleats in the gas bag wall and is releasably fixed to a rigid bearing part.

The loop can for example be releasably fixed in that in the first state of the gas bag, it is passed around a drive that is attached to a rigid bearing part.

Advantageously, the holder then has a clamping means for the cord that prevents a slipping of the cord along the drive. This clamping means can be a protrusion provided on the drive or a groove for receiving the cord, for example.

According to a preferred embodiment, the clamping means is formed integrally with an igniter of a gas generator. In that case, the igniter should be arranged in the immediate vicinity of the drive and should have a protrusion, for example, which provides for the necessary clamping of the cord in the first state of the gas bag.

The bearing part is more particularly a housing of a gas generator. The cord can be fixed thereto via the drive, a separation bolt for example. The cord can then be directly clamped in a simple manner by the igniter of the gas generator.

In the first state of the gas bag, the gas bag wall preferably has several pleats each having at least one opening per gas bag layer through which the fastening strap passes. By providing several pleats, it is possible to achieve an especially large volume increase during the transition from the first into the second state of the gas bag.

In the first state of the gas bag, the fastening strap preferably covers an opening in the pleat. Since the fastening strap, particularly when it extends in a V-shape, has a relatively large width, the opening in the gas bag wall is securely closed in this way when the gas bag is in the first state. In this embodiment, it is especially advantageous if in the first state of the gas bag it is not the fastening strap itself that is releasably fixed to the rigid bearing part but a cord is interconnected which can be pulled through the pleat(s) of the gas bag wall more easily when the holder is released.

Between the first state and the second state, the depth of the gas bag preferably changes by 20% at the most, which can be achieved by the provision of permanent holding straps, for example. In this manner, a rebound of the vehicle occupant due to a gas bag moving towards the occupant during the transition from the first into the second state is largely prevented.

Furthermore, the invention provides a gas bag module whose gas bag securely covers the steering wheel in a case of restraint.

This is achieved in a gas bag module having an gas bag whose wall, in a first, partially inflated state of the gas bag, has at least one pleat that is formed in that opposite sections of the wall lie against each other, and having a holder fixing the pleat. In its cut or blank, the gas bag has a bulge that is arranged radially outside the section of the gas bag wall forming the pleat. The bulge ensures that the inflated gas bag, in the state with folded pleat, has a uniformly round profile that evenly covers the steering wheel in all directions. Advantageously, this embodiment can be combined with the aforementioned embodiments, but this is not absolutely necessary. This means that this form of the gas bag is not necessarily limited to the embodiment as defined in the independent claim but has to be considered to be an independent invention. The appropriately cut gas bag could for example be combined with passively releasable holder (rupture seams, holder that are destroyed in some other way).

BRIEF DESCRIPTION OF THE DRAWINGS

FIG. 6 shows a partial section through a gas bag module according to a third embodiment of the invention in the first state of the gas bag;

FIG. 7 shows a section similar to FIG. 6 through a gas bag module according to a fourth embodiment of the invention, likewise in the first state of the gas bag;

FIG. 8 shows a partial section through a gas bag module according to a fifth embodiment of the invention;

FIG. 9 shows a partial section through a gas bag module according to a sixth embodiment of the invention;

FIG. 10 shows a partial section through a gas bag module according to a seventh embodiment of the invention;

FIG. 11 shows a partial section through a gas bag module according to an eighth embodiment of the invention;

FIG. 16a shows a top view onto the underside of a gas bag as used in a gas bag module according to a thirteenth embodiment of the invention, in a spread out state prior to installation;

FIG. 16b shows an enlarged detail of FIG. 16a; and

FIG. 17 shows a bottom view of a gas generator as used in the gas bag module according to FIG. 16a.

DETAILED DESCRIPTION OF THE PREFERRED EMBODIMENTS

Figure 1:
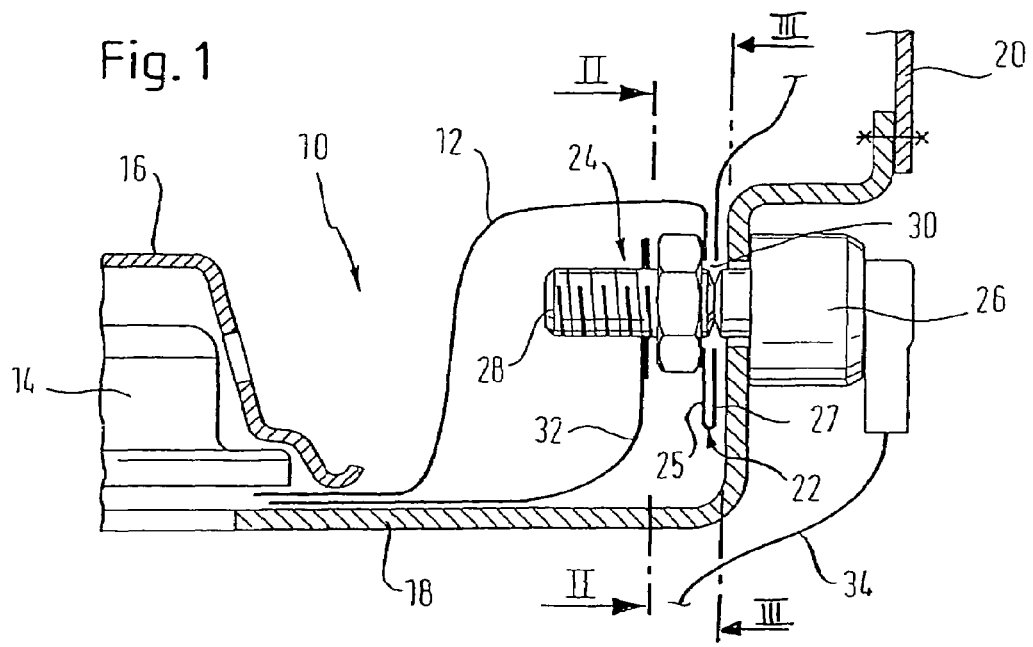
FIG. 1 shows a partial section through a gas bag module according to a first embodiment of the invention in a first state of the gas bag.

FIG. 1 shows a section of a gas bag module 10 with a gas bag 12 and a gas generator 14 that is surrounded by a cage 16. Here, for attachment purposes, one section of the gas bag 12, the so-called inflation opening, is clamped between the cage 16 and a generator support 18. The figure merely indicates a box-shaped covering cap 20 that is connected to the generator support 18 and that delimits the gas bag module 10 vis-à-vis the passenger compartment when the gas bag module has not been activated.

Figure 2:
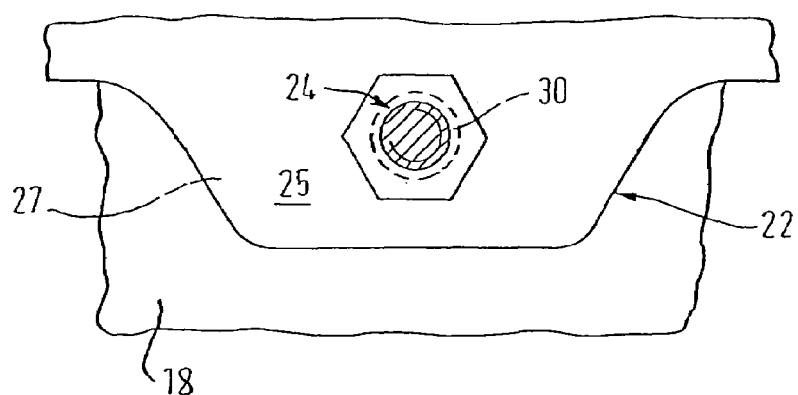
FIG. 2 shows a section across line II-II through the gas bag module of FIG. 1.

In the first state of the gas bag 12 shown in FIGS. 1 and 2, the wall of the gas bag 12 has a pleat 22 that is formed in that opposite sections 25, 27 of the gas bag wall lie against each other. The pleat 22 is affixed by means of a holder in the form of a separation bolt 24 and, at the same time, attached to a rigid bearing part which is the generator support 18 in the case shown here. The holder clamps the sections 25, 27 that form the pleat. In order to insert the separation bolt 24, which consists of a first part 26 that is permanently attached to the generator support 18 and a second part 28 that is separated at the time of the activation, openings 30 are provided in both of the sections 25, 27 of the gas bag wall that form the pleat 22, the openings 30 lying across from each other in the first state of the gas bag 12.

Moreover, a catching element in the form of a tether 32 is provided that connects the separable part 28 of the separation bolt 24 to the gas bag module 10, the second end of the tether 32 as well as the gas bag 12 being clamped between the cage 16 and the generator support 18. Moreover, the gas bag module 10 has a cable 34 that connects the separation bolt 24 to a control unit (not shown here).

When the gas bag 12 is deployed, it is initially in the first state shown in FIGS. 1 and 2, in which the separation bolt 24 affixes the pleat 22 to the generator support 18. As a result, not the entire possible gas bag volume is available and the gas bag 12 is inflated quickly, especially since the openings 30 present in the gas bag are initially closed off by the pleat 22 (as well as by the separation bolt 24).

Figure 3:
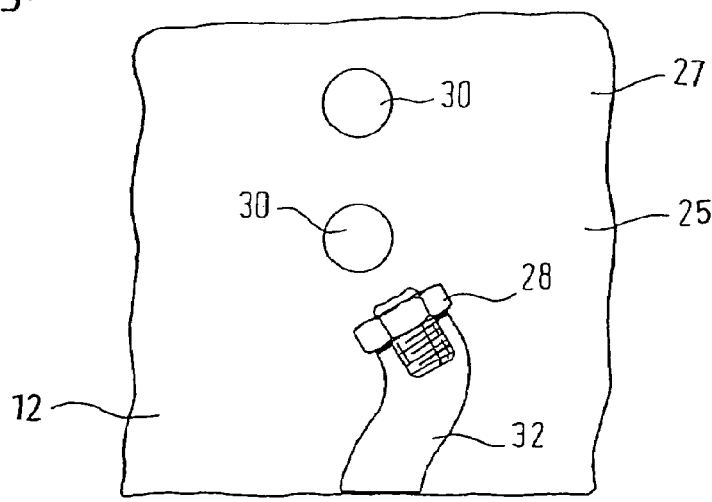
FIG. 3 shows a section across line III-III through the gas bag module of FIG. 1, but in a second state of the gas bag.

If the internal gas bag pressure in the deployed gas bag 12 is then to be reduced, a signal to this effect is transmitted from the control unit via the cable 34 to the separation bolt 24, as a result of which its pyrotechnical drive is activated, thus splitting the separation bolt 24 into the two parts 26 and 28. In this manner, the pleat 22 and thus the openings 30 are released (see FIG. 3). The part 28 of the separation bolt 24 that is separated at the time of the activation is held onto the gas bag module 10 by the tether 32, which can also, of course, be a wire, so that loose parts are prevented from being hurled around.

When this second state is reached, the internal pressure in the gas bag 12 is reduced in comparison to the first state since, first of all, the gas bag volume is increased by the area of the pleat 22, and secondly, the openings 30, which simultaneously serve as discharge openings, are released. Depending on the size, shape and number of pleats 22 provided as well as on the size of the openings 30, either the effect of the volume increase or else the effect of the discharge of gas is dominant. Of course, it is also possible to dispense with discharge openings in the area of the pleat 22, as a result of which the gas bag module 10 is limited only to the effect of the volume increase.

Figure 4:
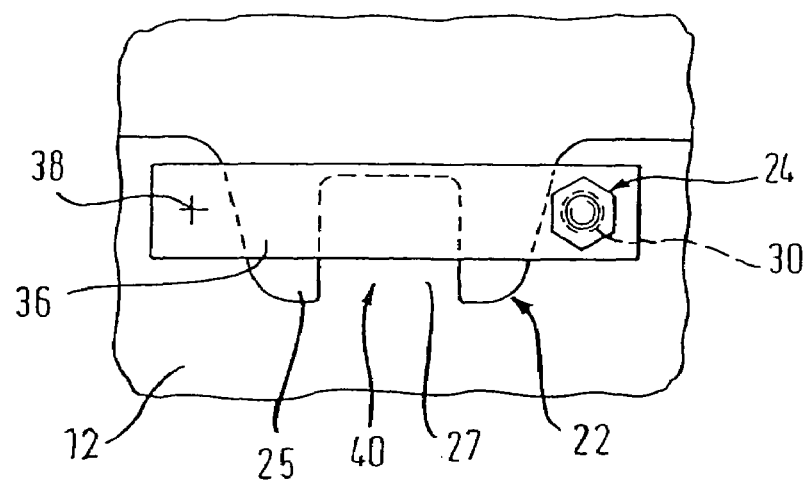
FIG. 4 shows a section similar to FIG. 2 through a gas bag module according to a second embodiment of the invention in the first state of the gas bag.
Figure 5:
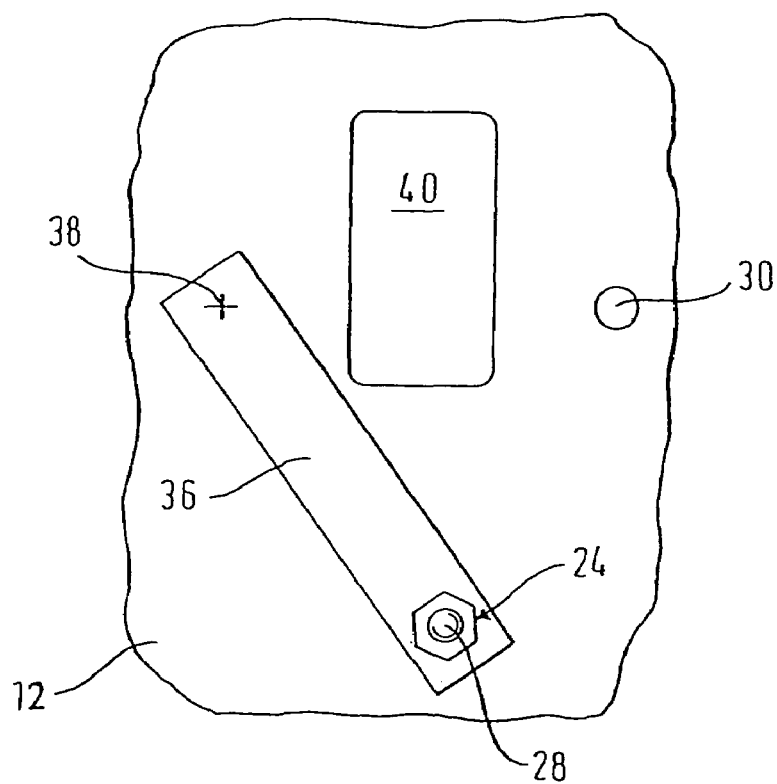
FIG. 5 shows a section corresponding to FIG. 4, but in the second state of the gas bag.

FIGS. 4 and 5 show another embodiment of the gas bag module according to the invention in which the holder also has a clamp strap 36 in addition to a separation bolt 24. This clamp strap 36 is connected to the generator support on one side by means of a fastening screw 38 and on the other side by means of the separation bolt 24 and, once again, it clamps a pleat 22 in the wall of the gas bag 12. In addition to a small opening 30 for inserting the separation bolt 24, another, rectangular, discharge opening 40 is provided in the vicinity of the pleat 22. It should be noted that in this embodiment, starting from the inflation opening, the gas bag 12 is directly guided along the generator support and that the pleat 22 as well as the clamp strap 36 are thus arranged in the interior of the gas bag 12.

In the first state of the gas bag 12, the pleat 22 is affixed by the clamp strap 36 as well as by the separation bolt 24, as a result of which the discharge opening 40 is closed. After the separation bolt 24 has been activated, the clamp strap 36 pivots downwards around the fastening screw 38, releasing the pleat 22 and thus also the discharge opening 40.

Of course, it is once again possible to dispense with the discharge opening 40 and to merely utilize the volume increase of the gas bag 12 brought about by the releasing of the holder and by the unfolding of the pleat 22 in order to reduce the internal gas bag pressure. Other variants comprise providing several pleats or creating several openings inside a pleat. Moreover, the opening that is formed can be round or else have a different shape.

Furthermore, the arrangement of the separation bolt 24 and of the holder relative to the gas bag module 10 can be varied in many ways. Consequently, the clamp strap 36 (and thus the pleat 22) can also be arranged vertically and, by the same token, they can be attached to the bottom of the module. The covering cap 20 can also be used to attach the holder. Furthermore, the gas bag pleat can also be affixed on the outside of the module rather than on the inside, the holder then directly engaging the outside wall section of the gas bag.

FIGS. 6 to 8 show various possibilities for attaching the separation bolt 24 to the generator support 18. Depending on the arrangement of the separation bolt 24, a different tensile force $F_A$ (indicated in the figures by an arrow) is exerted on the separation bolt 24 by the unfolding gas bag 12. As can be seen, in the embodiment according to FIG. 7, in which the separation bolt—like in FIG. 1—is arranged on a side wall of the generator support 18, the direction of the force $F_A$ includes an angle of about 115° with respect to the direction of a force $F_B$, which represents the pulling force of the separation bolt 24 or of its second part 28.

FIG. 6 shows an embodiment of the gas bag module 10 according to the invention in which the separation bolt 24 is arranged on the bottom of the generator support 18. As a result of this type of arrangement, the tensile force $F_A$ exerted by the unfolding gas bag 12 and the pulling force $F_B$ needed to release the bolt include an acute angle of approximately 45°. In order to optimize the tensile forces exerted by the gas bag 12 on the separation bolt 24, a shim 42 is provided at the upper end of the separation bolt 24 (as seen in the figure). By varying the size of the shim 42, particularly the point of application of the force $F_A$ can be changed. In addition, a rupture seam 44 is provided between the wall sections 25 and 27 and it holds the pleat 22 together at first. This rupture seam 44 likewise serves to optimize the tensile force in that it at least partially absorbs the tension generated by the unfolding gas bag 12. In this manner, the tensile forces exerted on the separation bolt 24 can be minimized.

In addition to the arrangement of the separation bolt 24, the size of the shim 42 and the provision of a rupture seam 44, additional factors for optimizing the reduction in the internal gas bag pressure caused by the releasing of the separation bolt 24 also include the number of pleats 22 (the volume difference between the first state and the second state of the gas bag changes as a function of the number of pleats) as well as the size of the openings 30 or of the discharge opening 40. In the embodiment according to FIG. 6, the opening 30a located at the top in the figure has a smaller diameter than the lower opening 30b. Of course, the reverse is equally well possible. Moreover, a gas bag slack 46 is provided between the place where the gas bag 12 is clamped onto the cage 16 and the place where it is attached to the generator support 18 by the separation bolt 24.

In another embodiment (FIG. 8), the separation bolt 24 is attached to the generator support 18 at such a slant that the direction of the pulling force $F_B$ exerted on the separation bolt 24 essentially coincides with the direction of the gas bag tensile force $F_A$. In this manner, tension is simultaneously exerted on the separation bolt 24 by the unfolding gas bag 12 and this tension assists in its opening.

As shown in FIG. 9, the holder can have a spring 48 that is arranged around the separation bolt 24. The spring 48 is supported on the upper part 28 of the separation bolt 24 or on a shim and it pushes the pleat 22 downwards (as shown in FIG. 9) towards the generator support 18. Thereby, the spring 48 makes it possible that the part 28 located above a pre-defined rupture line 49 can be separated from the gas bag 12 largely without being hindered and can leave the pleated area once the separation bolt 24 has been activated.

FIG. 10 shows another embodiment of the gas bag module 10 according to the invention in the first state of the gas bag in which, as already mentioned, several pleats 22 are provided in the gas bag wall. Once again, the separation bolt 24 consisting of a first part 26 and a second part 28 extends through the openings 30 in the gas bag sections that form the pleats 22 and thus affixes the pleats 22 relative to the generator support 18. The shim 42 is held at the upper end of the separation bolt 24 by a nut 50, the tether 32 for the separable part 28 being clamped between the nut 50 and the shim 42. In the further course of the tether 32, it passes through the gas bag wall. Around the separation bolt 24, or to put it more precisely, around an attachment 52 that forms the upper section of the stationary part 26, a sleeve 54 is provided that is connected to the generator support 18. In particular, this sleeve 54 is formed by shaping the generator support 18. The sleeve 54 serves to guide the spring 48 in order to prevent the latter from bending. Moreover, the sleeve 54 shields the part of the separation bolt 24 containing the pyrotechnical charge from the interior of the gas bag module 10, thus preventing damage to the gas bag 12 when the separation bolt 24 is triggered.

In contrast to the embodiment according to FIG. 9, here the spring 48 is arranged between the generator support 18 and the pleats 22, that is to say, it presses the pleats 22 upwards against the shim 42. This is practical since, in addition to the part 26, the entire attachment 52 (until directly below the shim 42) also remains firmly connected to the generator support 18 when the separation bolt 24 is activated. Consequently, the spring 48 now facilitates the "unfurling" of the pleats 22 from the stationary attachment 52.

The same applies to the embodiment shown in FIG. 11, which is very similar to that of FIG. 10. The sleeve 54, however, is configured as a separate component and extends further into the interior of the gas bag module. Here, the sleeve 54 also passes through the openings 30 in the pleats 22 of the gas bag wall. The sleeve 54 is closed towards the top by the shim 42 as well as by the nut 50, thus very effectively preventing damage to the gas bag fabric when the separation bolt 24 is activated. Therefore, the separation bolt 24 is encapsulated by the sleeve 54 and by the shim 42, so to speak.

Figure 12:
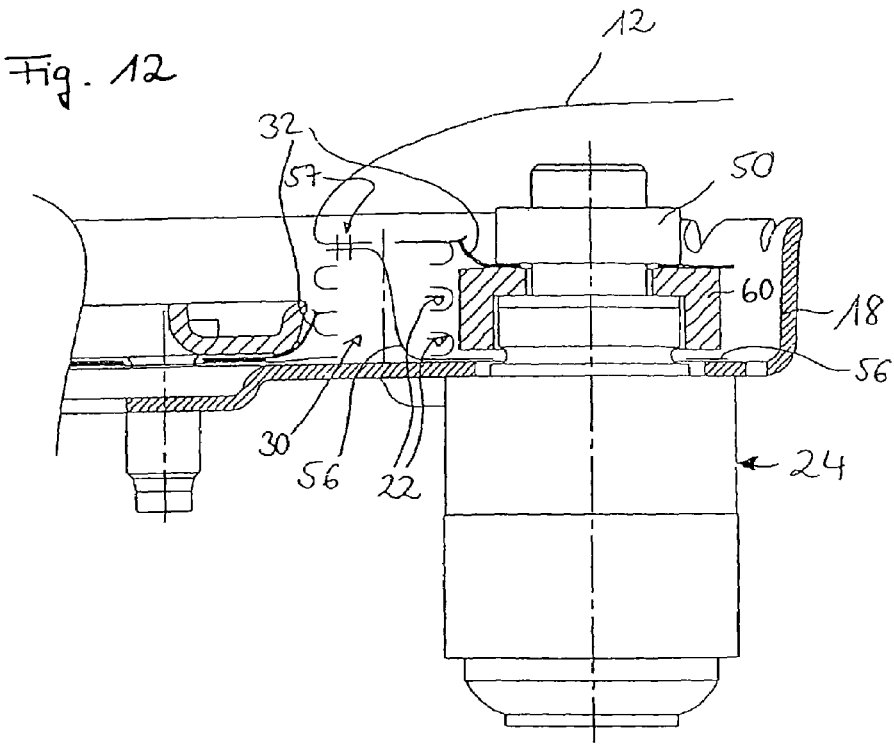
FIG. 12 shows a partial section through a gas bag module according to a ninth embodiment of the invention.
Figure 13:
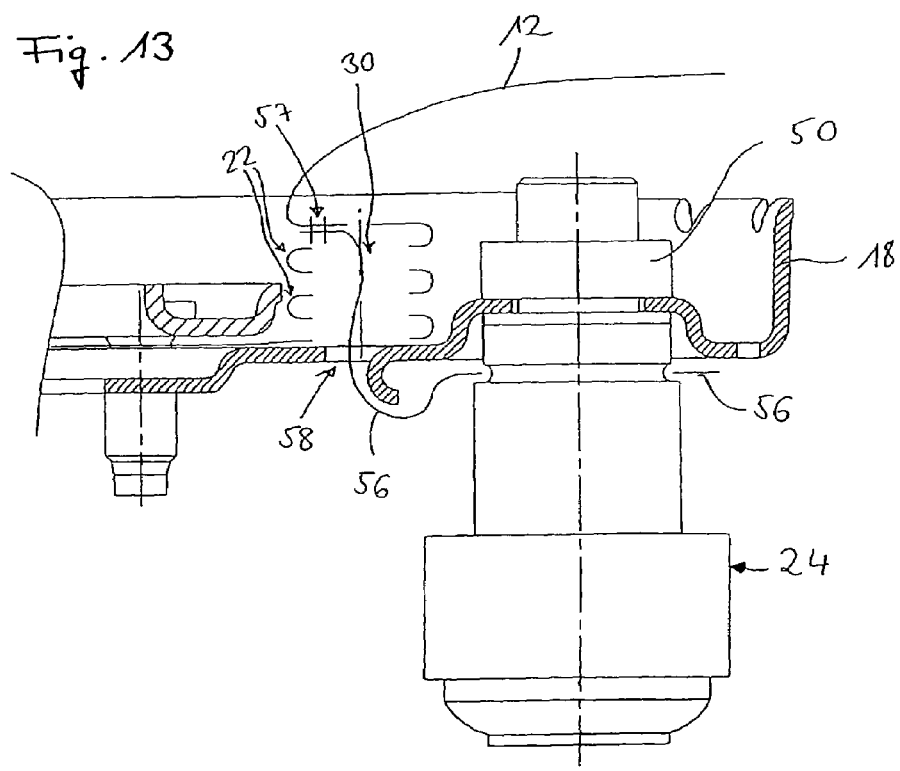
FIG. 13 shows a partial section through a gas bag module according to a tenth embodiment of the invention.

The two embodiments shown in FIGS. 12 and 13 differ from the ones already described mainly in that the pleats 22 of the gas bag 12 are not directly affixed by the separation bolt 24 in that the latter passes through the openings 30 in the pleats 22. Instead, a fastening strap 56 passes through the openings 30 whose first end is connected—especially sewed (reference numeral 57)—to the gas bag wall. The other end of the fastening strap 56 is fixed to the generator support 18 by the separation bolt 24, either on the inside as shown in FIG. 12 or else on the outside of the generator support 18 (FIG. 13). In the latter case, the fastening strap 56 passes to the outside through an opening 58 in the generator support 18. According to FIG. 12, a spacer 60 is provided between the nut 50 and the generator support 18, the fastening strap 56 being clamped by the spacer 60.

If the gas bag 12 is unfolded in case of restraint, then the limited length of the fastening strap 56 prevents the pleats 22 from unfolding and thus exposing the openings 30. When the separation bolt 24 is activated, it is severed at the level of the fastening strap 56 (in both embodiments). In one case (FIG. 12), the upper part of the separation bolt 24 is separated and in the other case (FIG. 13), the lower part of the separation bolt 24 is separated. Due to the internal gas bag pressure, the pleats 22 become taut, the now loose second end of the fastening strap 56 being pulled through the openings 30.

Figure 14:
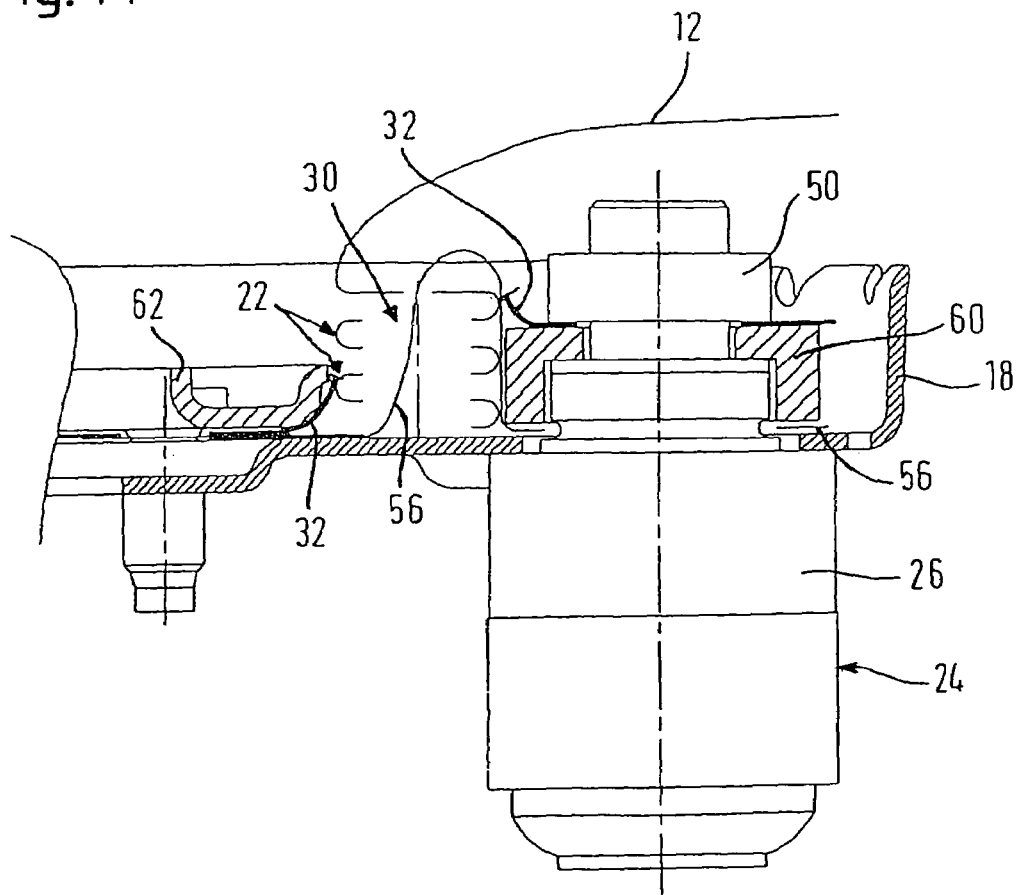
FIG. 14 shows a partial section through a gas bag module according to an eleventh embodiment of the invention.

FIG. 14 shows another embodiment of the invention, and here, in contrast to the embodiment of FIG. 12, the first end of the fastening strap 56 is attached to a rigid bearing part, especially latched to a gas bag holding plate 62. The fastening strap 56 then passes through the openings 30 in the pleats 22 as disclosed above and is affixed to the generator support 18 by means of the separation bolt.

Figure 15:
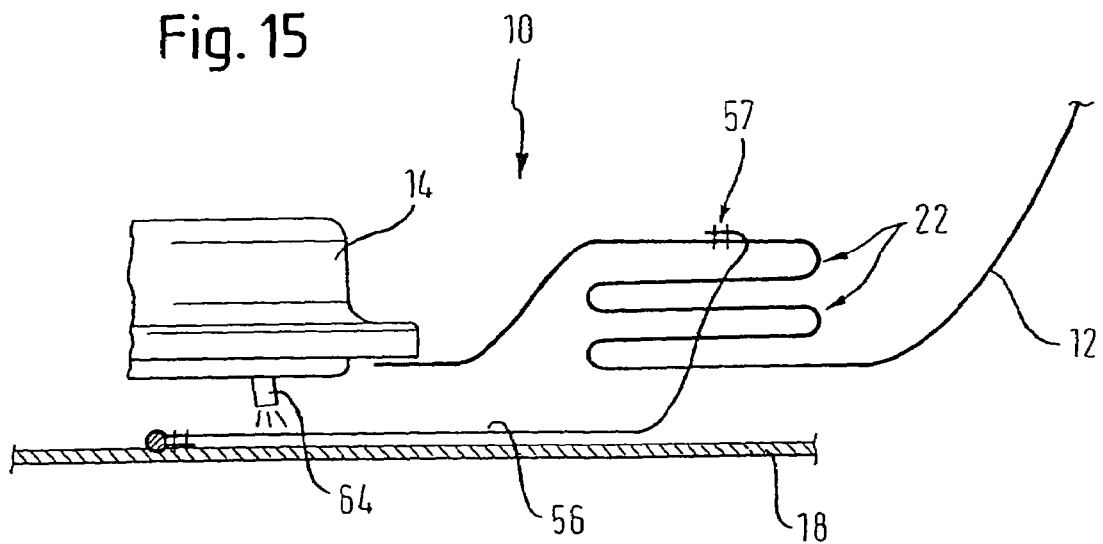
FIG. 15 shows a partial section through a gas bag module according to a twelfth embodiment of the invention.

FIG. 15 shows an embodiment of the gas bag module 10 according to the invention in which the pleats 22 in the gas bag wall are likewise affixed to the generator support 18 by means of the fastening strap 56 that is sewed to the gas bag 12. Unlike in FIG. 12, however, the fastening strap 56 runs to the middle of the gas bag module 10, to put it more precisely, to the area of the gas generator 14, and runs there between the gas generator 14 and the generator support 18. In this embodiment, the gas generator 14 is a multistage, especially two-stage, type. In order to release the fastening strap 56 in a controlled manner in case of restraint, a bypass is configured in the gas generator 14 that generates a mass flow of hot gas when the second stage is ignited, the mass flow being directed via a guide means 64 onto the fastening strap 56, at least partially. In this manner, the fastening strap 56 is burned or melted, that is to say, at least partly destroyed, thus releasing the pleats 22. Here, the second generator stage is ignited actively in response to a signal. In this embodiment, the drive for releasing the fastening strap 56 is integrated into the gas generator 14, which is why a separate drive such as, for example, a separation bolt, can be dispensed with.

FIG. 16*a* shows a top view onto the underside, facing away from the vehicle occupant, of a gas bag 12 as used in a last embodiment of the gas bag module according to the invention. The gas bag 12 is shown in a spread out state prior to installation in the gas bag module. In this embodiment, too, a fastening strap 56 is provided, but in contrast to the previous embodiments, this fastening strap has two ends connected to the gas bag wall. In the spread out state shown in the Figure (as well as in the state in which the gas bag 12 is inflated), the fastening strap 56 extends in a V-shape, the two legs of the V including an angle α of approximately 90° (cf. FIG. 16*b*). The junctions 66 of the fastening strap 56 with the gas bag wall are spatially separated from each other, and in the area of the junctions 66, the gas bag wall is provided with a reinforcement layer 68 that is sewed onto the outside of the wall.

In its lower, loose area that is not connected to the gas bag wall, the fastening strap 56 folded in a V-shape passes through a loop 72 formed by a cord 70. When the gas bag module is installed, the cord is threaded through the openings 30 in the gas bag wall (which also has a reinforcement layer 68 in the vicinity of the openings 30). Through a strong tensioning of the cord 70, the gas bag wall is laid in pleats (zigzag folding) in the vicinity of the openings 30, similarly to the embodiment according to FIG. 12. Due to the tensioning of the cord 70, the fastening strap 56 is pulled so far into the openings 30 that are substantially stacked after the folding, that the fastening strap 56 passes through the openings 30 in the pleats and thus largely covers these pleats in a gas-tight manner. The cord 70, which like the fastening strap 56 forms a part of the holder, is then releasably fixed to a rigid bearing part of the gas bag module, here the housing 74 of the gas generator 14 (FIG. 17).

This is achieved in that the loop 72 is guided around a drive 76 in the form of an separation bolt that is attached to the housing 74 of the gas generator 14. In the assembled state of the gas bag module, the gas generator 14 not shown in FIG. 16*a* is arranged in the vicinity of an inflation opening 78 in the interior of the gas bag 12.

The holder further comprises a clamping means 80 for the cord 70 in order to prevent that the loop 72 slips along the drive means 76 and that as a result the releasing of the loop 72 und thus of the pleats in the gas bag wall is hindered when the drive means 76 is actuated, here when the separation bolt is ignited. In the example shown, the clamping means 80 is formed integrally with an igniter 82 of the gas generator 14 which is arranged in the immediate vicinity of the drive means 76, as can be taken from FIG. 17. In particular, a squib plug of the igniter 82 is used as clamping means 80, the squib plug, like the squib plug 84 of the drive means 76, being put on after the loop 72 has been latched. The squib plug of the igniter 82 provides for an interlocking fit with the drive means 76.

Figure 17:
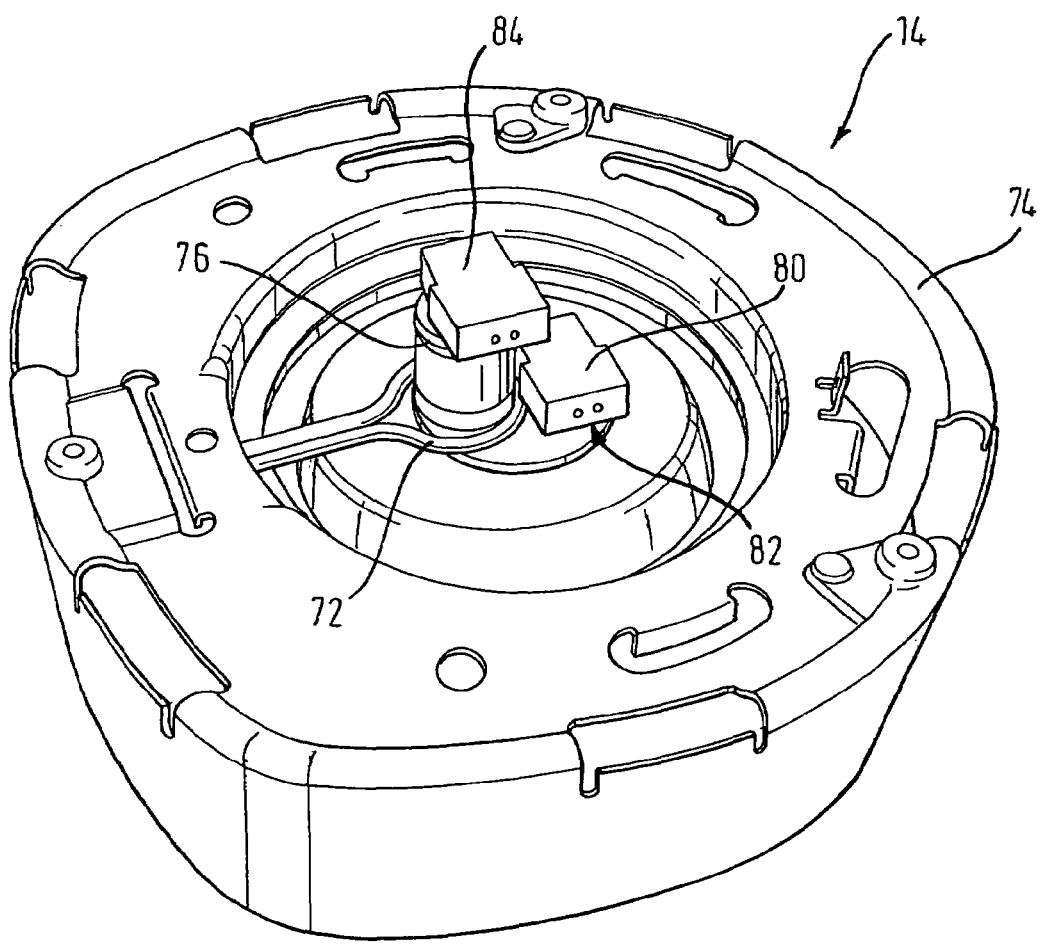

In the embodiment shown in FIG. 17, sections of the cord 70 lie against each other towards the edge of the gas generator 14, which need not absolutely be the case.

As can be further taken from FIG. 16*a*, the gas bag 12 has a bulge 86 in the cut, the bulge ensuring that in the first state of the gas bag, that is to say in the installed state with fixed pleats, the upper half of the gas bag 12 has approximately a semicircular form. For this purpose, the bulge 86 is arranged radially outside the section of the gas bag wall that forms the pleats, that means in the prolongation of a connecting line between the openings 30 and the inflation opening 78.

Figure 16:
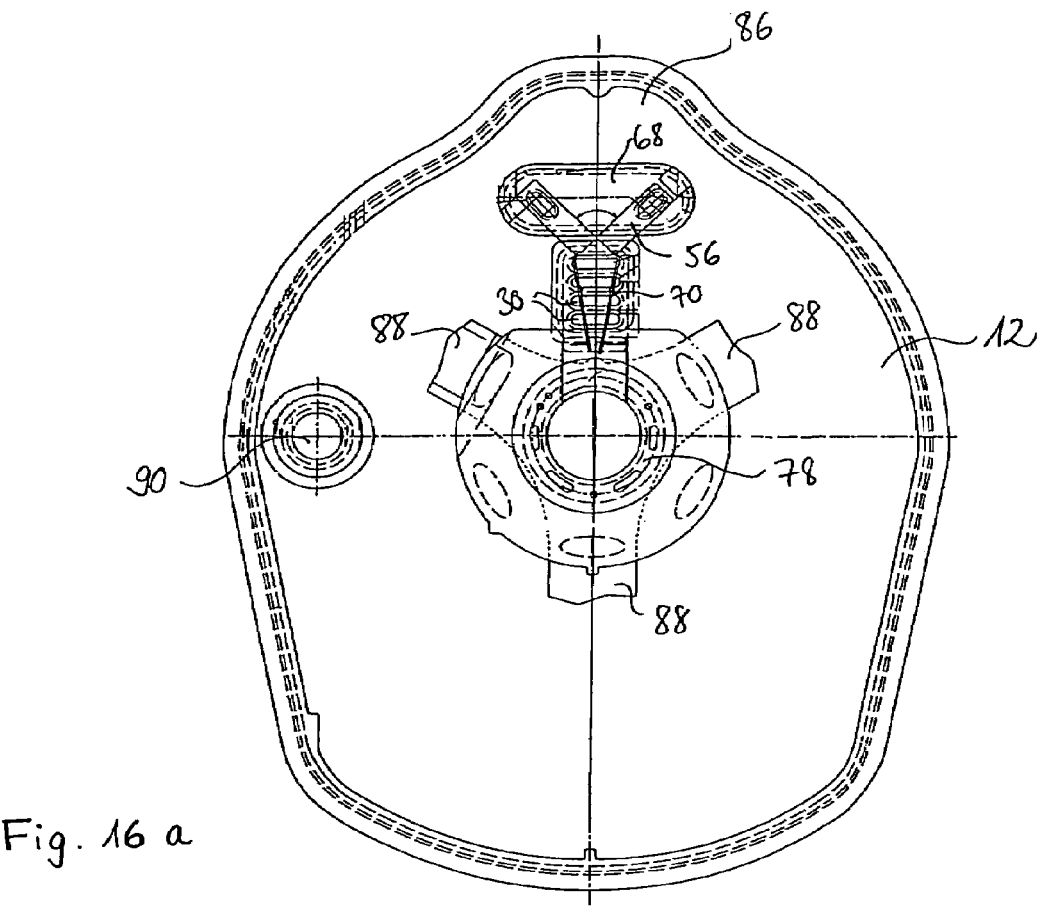
Figure 16:
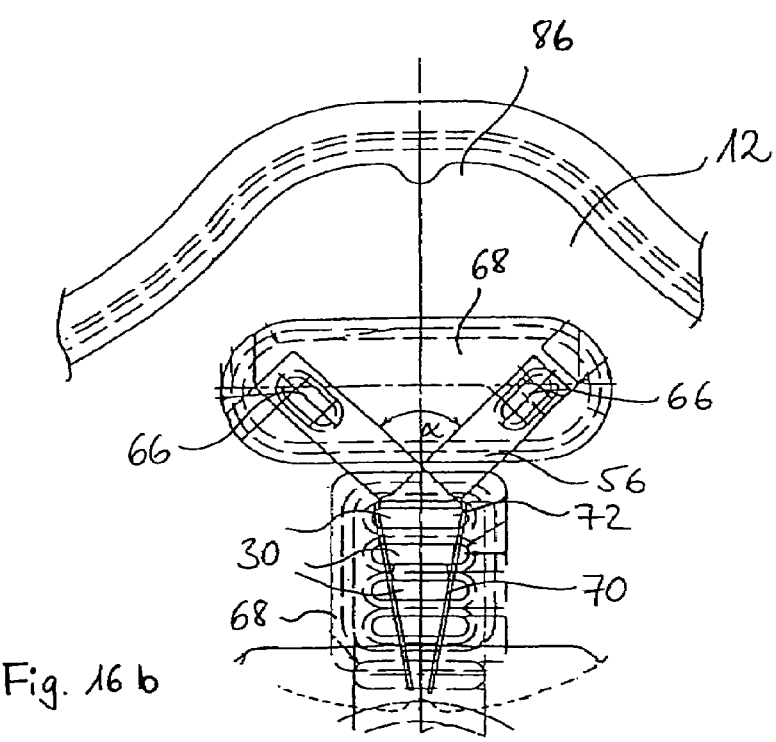

Furthermore, the gas bag 12 is provided with several holding straps 88 that are arranged in its interior and are made "visible" in the representation of FIG. 16*a*. The holding straps 88 are permanently connected, for example sewed, to the lower gas bag layer represented in FIG. 16 in the vicinity of the inflation opening 78 as well as to the upper gas bag layer not shown in the Figure. These holding straps 88 limit the depth of the unfolding gas bag. During the transition from the first state with fixed pleats to the second state with released pleats, the depth therefore hardly changes, in particular by 20% at most. That means that the volume increase of the gas bag 12 occurs primarily in the lateral or radial direction.

In addition to the openings 30, a permanently open discharge opening 90 is provided in the wall of the gas bag 12 in order to further enable a quick evacuation of the gas bag 12 after the completion of the restraint process, independently of the activation of the drive means 76.

Of course, it lies in the discretion of the person skilled in the art to use all of the described features individually as well as in combination with each other in order to achieve the objective according to the invention.

The invention claimed is:

1. A gas bag module having a gas bag (12) whose wall, in a first state of said gas bag (12), has at least one pleat (22) that is formed in that opposite sections of said wall lie against each other, and having a holder that holds said opposite sections together and affixes said pleat (22), said holder being actively releasable in response to a signal, as a result of which said gas bag (12) reaches a second state in which said pleat (22) is opened, wherein said holder has a fastening strap (56) with one end thereof being connected to said gas bag wall, said fastening strap (56) holding said pleat (22) by passing through an opening (30) in said pleat (22) in said first state of said gas bag (12).

2. The gas bag module according to claim 1, wherein said holder comprises a pyrotechnical drive.

3. The gas bag module according to claim 1, wherein at least one catching element is provided by means of which a part (28) of said holder that is separated when activated is connected to said module (10).

4. The gas bag module according to claim 1, wherein, in said second state, a lower internal pressure prevails in the unfolded gas bag (12) than in said first state.

5. The gas bag module according to claim 1, wherein said holder directly engages one of said sections of said wall that form said pleat (22).

6. The gas bag module according to claim 1, wherein the unfolded gas bag (12) has a larger volume in said second state than in said first state.

7. A gas bag module having a gas bag (12) whose wall, in a first state of said gas bag (12), has at least one pleat (22) that is formed in that opposite sections of said wall lie against each other, and having a holder that holds said opposite sections together and affixes said pleat (22), said holder being actively releasable in response to a signal, as a result of which said gas bag (12) reaches a second state in which said pleat (22) is opened, wherein said gas bag wall has at least one discharge opening (30; 40) in a vicinity of said pleat (22), wherein said holder has a fastening strap (56) with one end thereof being connected to said gas bag wall, said fastening strap (56) holding said pleat (22) by passing through said discharge opening (30, 40) in said pleat (22) in said first state of said gas bag (12).

8. The gas bag module according to claim 7, wherein in said first state of said gas bag (12), said discharge opening (30; 40) is closed by said pleat (22).

9. The gas bag module according to claim 1, wherein, in said first state of said gas bag (12), said gas bag wall has several pleats (22).

10. The gas bag module according to claim 1, wherein said holder comprises a drive that is integrated into a multi-stage gas generator (14).

11. The gas bag module according to claim 1, wherein one end of said fastening strap (56) is sewn (57) to said gas bag wall.

12. The gas bag module according to claim 7, wherein one end of said fastening strap (56) is attached to a rigid bearing part.

13. The gas bag module according to claim 7, wherein when a certain stage of said gas generator (14) is ignited, said fastening strap (56) is at least partially destroyed.

14. A gas bag module having a gas bag (12) whose wall, in a first state of said gas bag (12), has at least one pleat (22) that is formed in that opposite sections of said wall lie against each other, and having a holder that holds said opposite sections together and affixes said pleat (22), said holder being actively releasable in response to a signal, as a result of which said gas bag (12) reaches a second state in which said pleat (22) is opened, wherein said holder has a fastening strap (56) with two ends connected to said gas bag wall at junctions (66) spatially separated from each other, said fastening strap (56) holding said pleat (22) by passing through an opening (30) in said pleat (22) in said first state of said gas bag (12).

15. The gas bag module according to claim 14, wherein said fastening strap (56) extends in a V-shape when said gas bag (12) is in an inflated state.

16. The gas bag module according to claim 14, wherein said holder has a cord (70) that is releasably attached to a rigid bearing part.

17. A gas bag module having a gas bag (12) whose wall, in a first state of said gas bag (12), has at least one pleat (22) that is formed in that opposite sections of said wall lie against each other, and having a holder that holds said opposite sections together and affixes said pleat (22), said holder being actively releasable in response to a signal, as a result of which said gas bag (12) reaches a second state in which said pleat (22) is opened, said holder having a fastening strap (56) that holds said pleat (22) in said first state of said gas bag (12), and said holder having a cord (70) that is releasably attached to a rigid bearing part and forms a loop (72) through which said fastening strap (56) passes.

18. The gas bag module according to claim 17, wherein said loop (72) is passed around a drive (76) that is attached to a rigid bearing part.

19. The gas bag module according to claim 18, wherein said holder has a clamping means (80) for said cord (70) which prevents a slipping of said cord (70) along said drive (76).

20. The gas bag module according to claim 19, wherein said clamping means (80) is formed integrally with an igniter (82) of a gas generator (14).

21. The gas bag module according to claim 18, wherein said bearing part is a housing (74) of a gas generator (14).

22. The gas bag module according to claim 14, wherein in said first state of said gas bag (12), said gas bag wall has several pleats (22) each having at least one opening (30) per gas bag layer through which said fastening strap (56) passes.

23. The gas bag module according to claim 14, wherein in said first state of said gas bag (12), said fastening strap (56) covers an opening (30) in said pleat (22).

24. The gas bag module according to claim 1, wherein in its cut, said gas bag (12) has a bulge (86) that is arranged radially outside a section of said gas bag wall that forms the pleat (22).

25. The gas bag module according to claim 14, wherein said holder extends through said discharge opening in the first state.

26. A gas bag module having a gas bag (12) whose wall, in a first state of said gas bag (12), has at least one pleat (22) that is formed in that opposite sections of said wall lie against each other, and having a holder that holds said opposite sections together and affixes said pleat (22), said holder being actively releasable in response to a signal, as a result of which said gas bag (12) reaches a second state in which said pleat (22) is opened, wherein a rupture seam (44) is provided for purposes of an additional fixation of the pleat.

27. The gas bag module according to claim 1, wherein said holder has a separation bolt (24).

\* \* \* \* \*